United States Patent [19]
Zielinski et al.

[11] Patent Number: 5,520,103
[45] Date of Patent: May 28, 1996

[54] HEAT RETENTIVE FOOD SERVER

[75] Inventors: David J. Zielinski; Steven R. Lawson, both of Oklahoma City, Okla.

[73] Assignee: Continental Carlisle, Inc., Oklahoma City, Okla.

[21] Appl. No.: 472,883

[22] Filed: Jun. 7, 1995

[51] Int. Cl.$^6$ .................................................. A47G 23/04
[52] U.S. Cl. ........................ 99/483; 99/447; 126/246; 126/375; 206/545; 220/215; 220/422
[58] Field of Search ............................ 99/483, 401, 403, 99/422, 447; 126/246, 375; 220/421, 469, 912, 215, 422; 206/525, 545; 252/69, 70

[56] References Cited

U.S. PATENT DOCUMENTS

| | | | |
|---|---|---|---|
| 2,640,478 | 6/1953 | Flournoy | 126/375 |
| 2,767,563 | 10/1956 | Picascia | 62/142 |

(List continued on next page.)

FOREIGN PATENT DOCUMENTS

| | | |
|---|---|---|
| 665316 | 6/1963 | Canada. |
| 1265502 | 5/1961 | France. |
| 1426505 | 3/1976 | Switzerland. |

OTHER PUBLICATIONS

Article, "Heat–Retaining Capabilities of Selected Delivery Systems" by Lois Adamski Shea, R. D. (7 pages) Reprinted from the *Journal of American Dietetic Assoc.* vol. 65, No. 4, Oct. 1974.
Brochure, "An Introduction of Material Properties and Processing—ULTEM™ Resin," by General Electric Co. (19 pages), Undated.
Brochure, "ULTEM™ Polyetherimida for Dual Ovenable Applications" by General Electric Co. (12 pages), Undated.
Letter from Jerome H. Heckman, Esq. of Keller and Heckman, Washington, D.C. to Dr. Prakash Surana of General Electric Co., Regarding ULTRM™ Resin FDA Compliance, (3 pages), Mar. 1, 1982.

Letter from Olinda W. Rush of General Electric Co. to Kendrick Johnson, Regarding Patents Relating to ULTEM™ Polyetherimida Resin, (1 page), Sep. 12, 1985, Brochurem, "GEPAX Engineered Plastics Packaging," by General Electric Co. (12 pages), Jul. 1985.
Technical Data Report, "Release No. 400, Plastic Waxes," by Petrolite Corporation (2 pages), Sep. 1982, Technical Data Report, Release No. 300 Hard Microcrystalline Waxes, by Petrolite Corporation (2 pages), Feb. 1983.
Brochure, "New Product Information: New Polycaprolactone Thermoplastic Polymers PCL–300 and PCL–700," by Union Carbide Corporation (15 pages), Circa Nov. 27, 1985.
Product Specification, "Tone, P–300 Polymer," by Union Carbide Corporation (1 page), Aug. 23, 1983.
Product Specification, "'Tone' P–700 Polymer," by Union Carbide Corporation (1 page), Aug. 23, 1983.
Brochure, "The ENSOLITE™ Family of Foams" by Uniroyal, Inc. (10 pages), 1983.
Brochure, "Tenative Physical Property Specification for Type IVC (ENSOLITE™ Foam)," by Uniroyal, Inc. (2 pages), Apr. 1985.
Brochure, "Westlake Plastics Company–Thermoplastics for Industry," by Westlake Plastics Company (6 pages), Sep. 1984.

(List continued on next page.)

*Primary Examiner*—Stephen F. Gerrity
*Assistant Examiner*—Reginald L. Alexander
*Attorney, Agent, or Firm*—Dougherty, Hessin, Beavers & Gilbert

[57] ABSTRACT

A heat retentive server for maintaining food at a desired temperature for an extended period of time includes an upper and lower shell which define a cavity therebetween. A heat storage medium comprised of a phase change material is disposed in the cavity. When the server is heated, the phase change material changes from a solid to a viscous gelatinous state and stores heat therein. When the material cools and changes from its viscous gelatinous state back to a solid, the heat is released through the shell so that food placed adjacent the server will be maintained at an elevated temperature.

26 Claims, 4 Drawing Sheets

U.S. PATENT DOCUMENTS

| | | | |
|---|---|---|---|
| 2,771,754 | 11/1956 | Winkler | 65/15 |
| 3,019,783 | 2/1962 | Clarke | 126/381 |
| 3,118,560 | 1/1964 | Cornelius | 220/14 |
| 3,148,676 | 9/1964 | Truog et al. | 126/246 |
| 3,322,113 | 5/1967 | Simjian | 126/390 |
| 3,470,944 | 10/1969 | Segal | 165/47 |
| 3,557,774 | 1/1971 | Kreis | 126/246 |
| 3,608,770 | 9/1971 | Naimoli | 220/16 |
| 3,613,933 | 10/1971 | Pilz | 220/4 |
| 3,633,785 | 1/1972 | Cyr | 220/20 |
| 3,734,077 | 5/1973 | Murdough et al. | 126/246 |
| 3,754,640 | 8/1973 | Bridges | 206/4 |
| 3,799,386 | 3/1974 | Madalin et al. | 220/16 |
| 3,916,872 | 11/1975 | Kreis et al. | 126/375 |
| 3,938,688 | 2/1976 | Ryan | 220/23.8 |
| 4,141,927 | 2/1979 | White et al. | 260/857 |
| 4,158,126 | 6/1979 | Seitz | 219/439 |
| 4,161,557 | 7/1979 | Suzuki et al. | 428/1 |
| 4,179,499 | 12/1979 | Christensen | 424/143 |
| 4,182,405 | 1/1980 | Rysen et al. | 165/48 |
| 4,246,884 | 1/1981 | Vandas | 126/246 |
| 4,250,279 | 2/1981 | Robeson et al. | 525/425 |
| 4,258,695 | 3/1981 | McCarton et al. | 126/375 |
| 4,380,794 | 4/1983 | Lawson | 362/296 |
| 4,394,906 | 7/1983 | Hollenbeck | 206/525 |
| 4,505,252 | 3/1985 | Wada et al. | 126/246 |
| 4,510,919 | 4/1985 | Benmussa | 126/263 |
| 4,530,344 | 7/1985 | Iyengar et al. | 126/246 |
| 4,533,061 | 8/1985 | Herbst | 220/4 |
| 4,559,921 | 12/1985 | Benmussa | 126/263 |
| 4,567,877 | 2/1986 | Sepahpur | 126/246 |
| 4,587,279 | 5/1986 | Salyer et al. | 523/206 |
| 4,617,332 | 10/1986 | Salyer et al. | 524/4 |
| 4,711,813 | 12/1987 | Salyer | 428/402 |
| 4,777,931 | 10/1988 | Ziegler et al. | 126/246 |
| 4,785,968 | 11/1988 | Logan et al. | 220/410 |
| 4,797,160 | 1/1989 | Salyer | 106/96 |
| 4,825,939 | 6/1989 | Salyer et al. | 165/53 |
| 4,908,166 | 3/1990 | Sayler | 264/22 |
| 4,917,076 | 4/1990 | Nadolph et al. | 126/375 |
| 4,982,722 | 1/1991 | Wyatt | 126/400 |
| 5,016,756 | 5/1991 | Wischhusen et al. | 206/545 |
| 5,052,369 | 10/1991 | Johnson | 126/400 |
| 5,125,391 | 6/1992 | Srivastava et al. | 126/246 |

OTHER PUBLICATIONS

Brochure, "Basic Shapes Processed from ULTEM™ Polyethersulfone Resin," by Westlake Plastics Company (2 pages), Undated.

Brochure, "Basic Shapes Processed from VICTREX™ Polyethersulfone Resin," by Westlake Plastics Company (2 pages), Undated.

Brochure, "Aladdin–The Pellet Base You don't Have to Heat," by Aladdin Industries, Inc. (3 pages), Undated.

Brochure, "Cost–Efficient Choices for Changing Times," by Aladdin Industries, Inc. (16 pages), 1983.

Brochure, "Counselor" vol. 6 Issue No. 1, Published by Aladdin Synergetics, Inc. (16 pages), 1984.

Brochure, "Counselor," vol. 7, Issue No. 1, Published by Aladdin Synergetics, Inc. (12 pages), 1985.

Brochure, "Everything You've Ever Wanted to Know About Efficient Hospital Feeding," by Caddy Corporation of America (20 pages), Aug. 1982.

Brochure, "TEMP–LOCK"™ II for Modern Hospital Food Service, by Caddy Corporation of America (4 pages), 1983.

Brochure, "TEMP–Lock™ II for Hospitals & Nursing Homes," by Caddy Corporation of America (4 pages), Jan. 1979.

Brochure, "MEGA–TEMP™ Pellet–Less," by Caddy Corporation of America (6 pages), 1985.

Brochure, (Catalog No. 450), "Cambro Quality Products and Superior Service for Foodservice Industry," by Cambro (40 pages), Apr. 1981.

Brochure, "Yesterday Finnessa's Patented Plate Warmer Concept was an Innovative Breakthrough . . . Today it is Tried and Proven" by Finessa Corporation (4 pages), Undated.

Brochure, "60 Minutes Later . . . And Its Still Hot," by Seco Products (6 pages), Undated.

Brochure, "SECO™ Unitized Bases," by Seco Products of Bastian Industries (6 pages), Undated.

Brochure, "Therma Tray Insulated Dome & Base," by Therma Tray Corporation (4 pages), Oct. 12, 1985.

Brochure, "DINET™ Insulated Cover from DI–NEX™" by Dinex Products, A Division of Thermos Company (8 pages), 1984.

Brochure, "3M Technology Connects You to the Advanced Food Preparation Method," by 3M (9 pages), Undated.

Brochure, "Serve Them with Respect," by USECO (i.e., United Service Equipment Co.) (6 pages), Undated.

HEAT RETENTIVE FOOD SERVER

BACKGROUND OF THE INVENTION

The present invention generally relates to heat retaining food service devices and more particularly to heat retentive food servers which use a phase change material as a heat storage medium.

There are numerous food service operations which require the use of heat retentive devices to keep food warm for a period of time until it can be served. For instance, hospitals, nursing homes, hotels and other establishments typically have a central kitchen in which food is prepared. After the food is prepared, it must be transported and delivered, creating a delay between the time the food is prepared and the time the food is served. The delay can be such that the food being served is no longer warm when it reaches the ultimate destination. Therefore, numerous devices have been developed to keep food warm for a period of time after preparation. One approach to keeping food warm has simply been to provide a cover or dome with a layer of insulation material disposed therein which can be placed over a plate. Insulated underbases on which a food bearing dinner plate can be placed have also been utilized. Other devices include servers which can be heated to an elevated temperature. Such servers can keep food warm for a relatively long period of time, and include food covers, or domes, along with food holders, such as plates.

A number of such servers are comprised of a hollow shell with a cavity disposed therein. A heat retentive medium is placed in the cavity so that when the containers are heated, the heat retentive medium will store heat and then release heat to maintain food placed adjacent the server at an elevated temperature. The heat retentive medium typically is a wax, or wax mixture. Because wax liquifies when heated, leakage can be a problem with such servers. Thus, servers utilizing a wax-type of heat retentive medium typically have an additional enclosure within the server to seal the wax so that leakage through the server does not occur. The additional enclosure makes construction of such servers more time consuming and expensive than would be necessary if such additional enclosures were not required.

Thus, there is a need for a heat retaining food service container which can be easily constructed, which provides the desired heat retaining characteristics and which eliminates leakage problems.

SUMMARY OF THE INVENTION

The present invention provides a heat retentive food service device which uses a phase change material as a heat storage medium. The invention eliminates leakage problems, is of simple, inexpensive construction and has sufficient heat retaining capacity to maintain food at elevated temperatures for extended periods of time.

The invention is a heat retentive food server comprised of an outer shell assembly which may consist of an upper shell member and a lower shell member. The upper shell member and lower shell members are joined together at their peripheral portions, and have a cavity defined therebetween. There is preferably only one cavity defined by the outer shell assembly. The cavity is uninterrupted and not divided in any way.

A heat storage medium is disposed in the cavity, and preferably substantially fills the entire cavity. The heat storage medium is a phase change material which, when heated, will change from a solid, the state in which it exists at room temperature, to a viscous, gelatinous state. The term solid means that while the material has some resilience, it is firm and will hold a shape. Because the phase change material is initially in a solid state, the material can be formed, by extruding, injection molding, or otherwise, into the shape of the cavity. The phase change material is unrestrained within the cavity. In other words, no internal chambers or other enclosures are needed to restrain the phase change material in the cavity to prevent leakage, since the phase change material does not liquify but simply becomes gelatinous. When the phase change material changes phase from a solid to a gelatinous state, heat is stored therein. The heat stored therein is slowly released through the outer shell as the phase change material changes from its gelatinous state back to a solid. Thus, food placed on, or adjacent food servers made in accordance with the present invention will be maintained at an elevated temperature for extended periods of time. The servers will maintain food at a temperature of at least 145° F. for a period of at least 60 minutes. The preferred phase change material is ethylene vinyl acetate (EVA).

The server may comprise a food cover, or dome, which can be placed upon or over an underlying food holder such as a plate. In such a case, heat will be released through the shell of the server so that food placed thereunder will be maintained at an elevated temperature for an extended period of time. The server may also be a food holder such as a plate, food pan or other holder. In such a case, the heat will be transferred from the phase change material through the shell so that the food placed on the server will be maintained at an elevated temperature.

The phase change temperature of the heat storage medium is preferably from 190° to 230° F. and more preferably approximately 210° F. The upper and lower shells are preferably made from a thermoplastic material which is heat stable to at least 230° F. The material may be, but is not limited to polycarbonate material. Because the shells are made from a material which has a degradation temperature higher than the phase change temperature of the phase change material, the servers can be constantly and repeatedly cycled to the phase change temperature without diminishing the material properties of the outer shell.

It is thus an object of the invention to provide a heat retentive server which can be easily constructed. It is a further object of the invention to provide a heat retentive server with a phase change material that will not leak from the server. It is a further object to provide a heat retentive server with a phase change material that is solid at room temperature so that the material can be formed into reproducible shapes.

The present food server is thus advantageous in that it is capable of easy construction, provides an efficient heat storage system, and is relatively inexpensive to fabricate in a variety of shapes and sizes.

DESCRIPTION OF A PREFERRED EMBODIMENT

Figure 1:
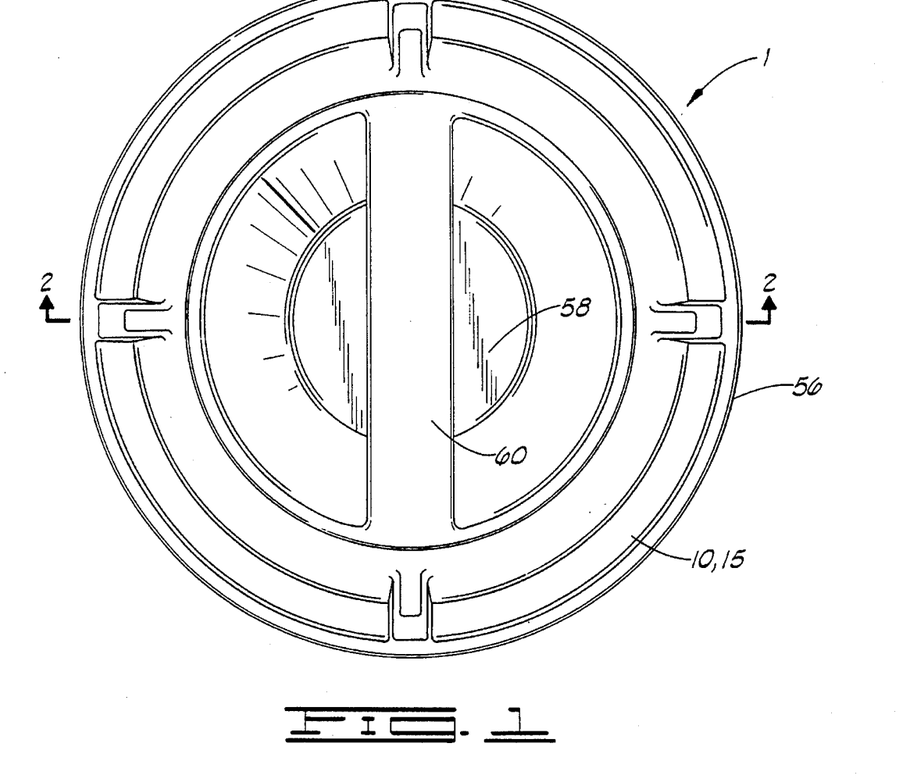
FIG. 1 shows a top view of a heat retentive food server of the present invention.
Figure 2:
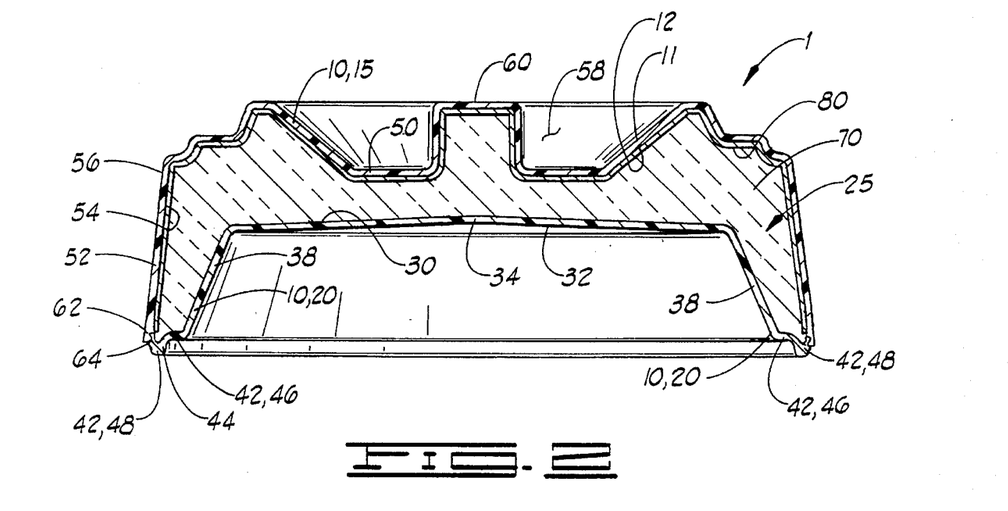
FIG. 2 shows a view taken through section 2—2 of FIG. 1.

Referring now to the drawings, and more particularly to FIG. 1, there is shown an embodiment of a heat retentive food server 1 of the present invention. The embodiment shown in FIG. 1 is a food cover which may be used with an underlying food holder 2, such as the plate schematically shown in FIG. 4. The food cover 1 includes an outer shell assembly 10 having an outer surface 11 and an inner surface 12. The outer shell assembly 10 is comprised of an upper shell 15 and a lower shell 20, and has a cavity 25 defined by the upper and lower shells. As shown in FIG. 2, the cavity 25 defined by the upper and lower shells is preferably a single cavity which is uninterrupted and undivided. In other words, there are no restrictions, partitions or additional enclosures located within the cavity.

Figure 4:
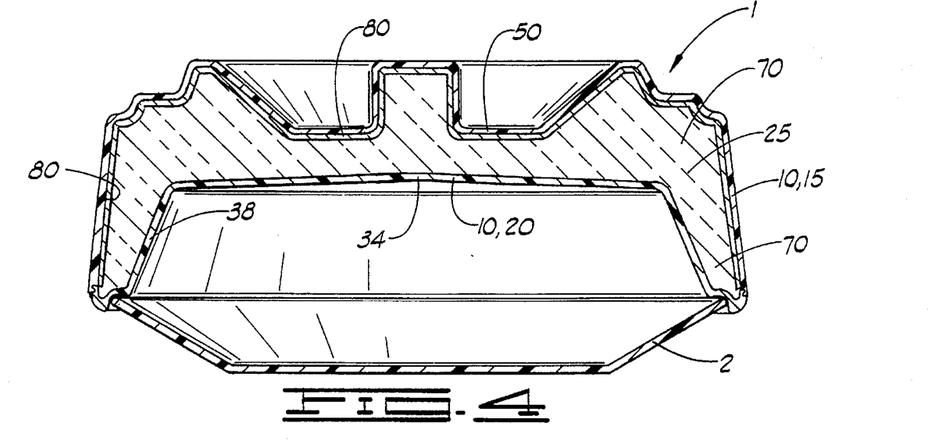
FIG. 4 shows the heat retentive food server of FIG. 1 in combination with an underlying food plate.

Lower shell 20 has an inner surface 30, an outer surface 32, and a top wall 34. A side wall 38 extends downward from and merges with top wall 34. Side wall 38 may also include a lip 42 at a peripheral portion 44, which may also be referred to as the lower end 44 thereof. Lip 42 is comprised of a substantially horizontal portion 46 and a downwardly extending portion 48. Lip 42 will engage the rim of a plate or other food holder placed therebelow as shown in FIG. 4 to completely cover the plate and any food placed thereon.

Upper shell 15 may include a top wall 50 with a side wall or side leg 52 extending downwardly therefrom. Upper shell 15 has an inner surface 54, an outer surface 56, and a lower end, or peripheral portion 62. Thus, outer surface 11 of outer shell 10 is comprised of outer surfaces 32 and 56 of the lower and upper shells respectively while inner surface 12 is comprised of inner surfaces 30 and 54 of the lower and upper shells respectively. As shown in FIG. 2, the upper shell 15 surrounds the lower shell 20, thereby defining the cavity 25.

Figure 2A:
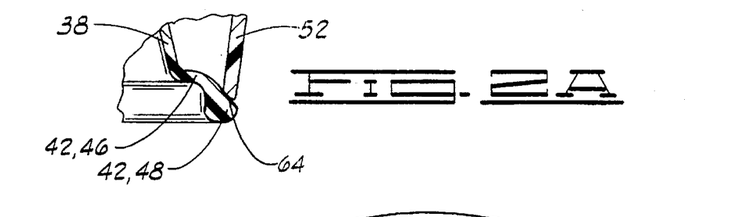
FIG. 2A shows an alternative embodiment at the joint of the outer shell assembly of the embodiment shown in FIG. 1.
Figure 3:
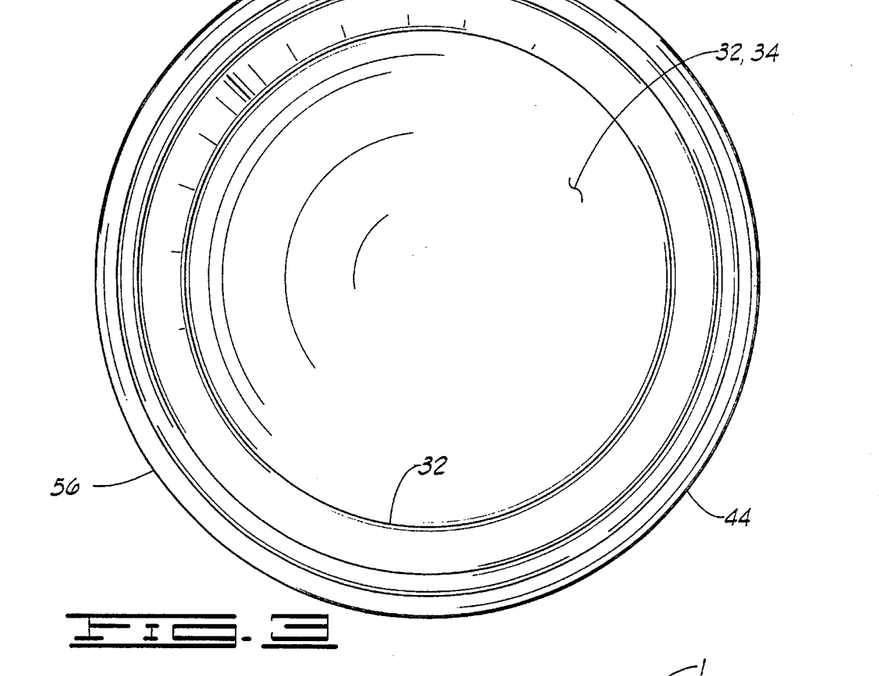
FIG. 3 shows a bottom view of the heat retentive food server of the present invention.

The upper shell may also include a central recess 58 and a handle 60. The handle 60 may span the full diameter of the central recess 58. The upper and lower shells are joined at their peripheral portions at a joint 64. FIG. 1 shows a snap-ring type of configuration at joint 64. However, numerous configurations are acceptable. For instance, the upper and lower shells may have flat surfaces at the ends thereof that can simply be abutted as depicted in FIG. 2A. The joint 64 is sealed with a polycarbonate sealant, which may be, but which is not limited to 3M® products identified as 3M® No. 1099, which will withstand temperatures of up to 210°, or 3 M® No. 1838, which will withstand temperatures of up to 350°. Any polycarbonate sealant capable of withstanding repeated heating up to a temperature of at least 230° F. without losing its material properties may be used.

A heat storage medium 70 is disposed in cavity 25. The heat storage medium is a phase change material which substantially fills the cavity, and which has a phase change temperature of preferably 190° F. to 230° F. and more preferably approximately 210° F. The phase change material is a solid at room temperature which becomes viscous and gelatinous, but which does not liquify, when heated to its phase change temperature. The phase change material is preferably ethylene vinyl acetate ("EVA"), and has no wax added or mixed therewith.

The upper and lower shells are preferably made from a thermoplastic material capable of withstanding repeated and prolonged temperature increases to at least 230° F. without a loss of material properties. Clearly, any type of thermoplastic material capable of withstanding greater temperatures can be used. Because the phase change material does not melt but simply becomes gelatinous, there is no need to enclose the phase change material or to restrict its flow within the cavity. The phase change material is therefore unrestrained within the cavity. In other words, the phase change material is not restrained by additional pouches in the cavity or by partitions, restrictions or any other artificial means. Such restraints are not needed since, as noted, the phase change material becomes gelatinous but does not liquify at its phase change temperature. Leakage problems are thus eliminated without the need for other artificial seals, enclosures or restraints in the cavity as required with prior art servers, and the food server can be made of a simple two-piece outer construction.

Further, because the phase change material is in a solid state at room temperature, the server 1 may be constructed by forming a block of phase change material in substantially the same shape as the cavity. The block can be formed by injection molding or otherwise to the proper configuration. The upper and lower shells can then simply be joined together around the phase change material and sealed with polycarbonate sealant at joint 64.

When the phase change material is heated to its phase change temperature so that it changes phase from a solid to a gelatinous state, heat is stored therein. The phase change material will typically change phase when heated to 210° to 230° for approximately two hours. The heat stored in the material is released at a slow rate as the material changes from the gelatinous state back to a solid. Thus, when the food server 1 is placed over a plate containing food, heat is directed through the outer shell and will maintain food placed thereunder at an elevated temperature for an extended period of time. The underlying food holder may be of virtually any material, such as ceramic or thermoplastic. Typically, food will be placed under the cover shortly after it is removed from an oven, and will be at a temperature in a range from 170° to 200° F., and more preferably from 185° to 195° F. The cover 1 will maintain such food at a temperature of at least 145° F. for at least 60 minutes. Thus, when it reaches its ultimate destination, the food is still at an acceptable and desirable serving temperature.

The food server 1 may also include an insulator 80. In the embodiment shown in FIG. 2, the insulator is interposed between the phase change material and the upper shell 15. The insulator 80 will prevent heat stored in the phase change material from dissipating through the upper shell and also will direct the heat downward through the lower shell. In this way, the heat stored is transferred to the food to maintain the food at an elevated temperature rather than dissipating through the upper shell and into the environment. The insulator can be any type of insulating material capable of withstanding the temperatures described herein. One acceptable insulating material is commercially available from the Carborundum Company and is known as Fiber Frax® grade 440 ceramic fiber paper. The paper is a high strength composite paper made from a combination of ceramic fiber, inert fillers and reinforcing fiberglass.

Figure 5:
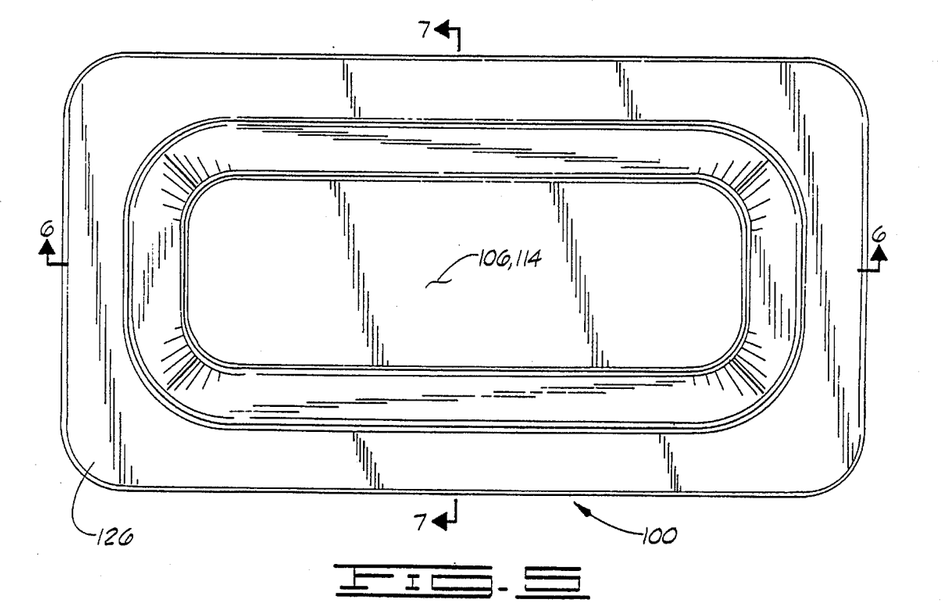
FIG. 5 shows a top view of an additional embodiment of a food server of the present invention.
Figure 6:
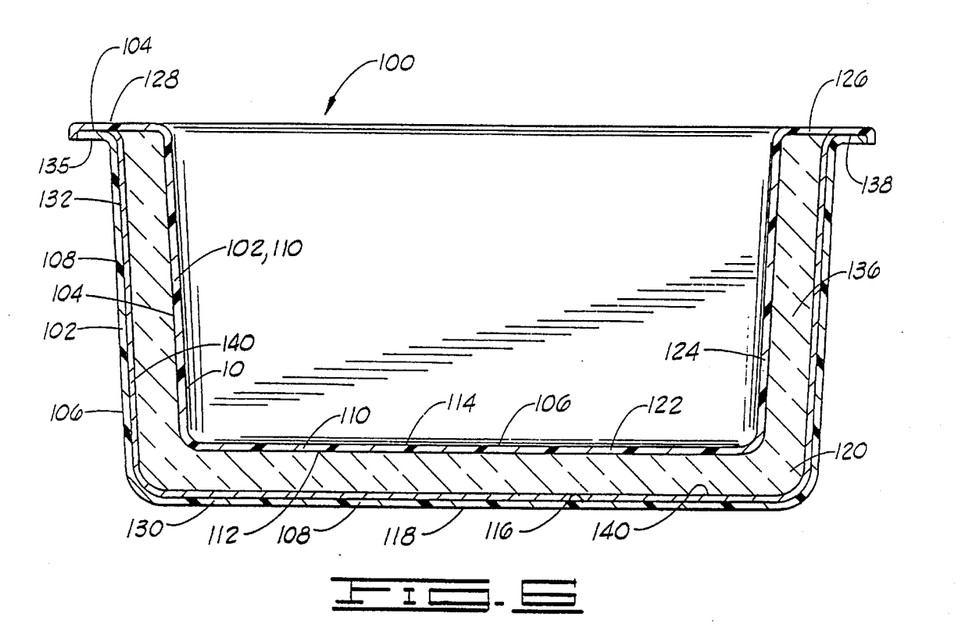
FIG. 6 shows a view taken through section 6—6 of FIG. 5.
Figure 7:
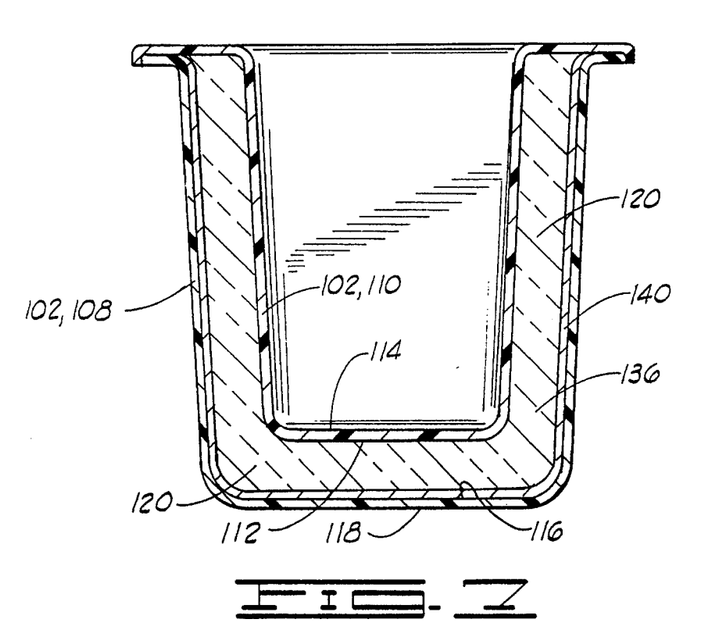
FIG. 7 shows a view taken through section 7—7 of FIG. 5.

An additional embodiment of the present invention is shown in FIGS. 5 through 7. Referring to FIG. 5, a food server 100, which comprises a food holder, or food pan is shown therein. The pan includes an outer shell assembly 102 having an inner surface 104 and outer surface 106. The outer shell assembly is comprised of a lower shell 108 and an upper shell 110. The lower shell 108 can be described as surrounding the upper shell 110. The upper shell has an inner surface 112 and an outer surface 114. Lower shell 108 has an inner surface 116 and an outer surface 118. Thus, inner surface 104 is comprised of inner surface 112 and inner surface 116 of the upper and lower shells respectively. Outer surface 108 is comprised of outer surfaces 114 and 118 of the upper and lower shells respectively. A cavity 120 is defined by the outer shell assembly. The cavity is defined by the upper and lower shells and is preferably a single undivided and uninterrupted cavity as previously described with respect to the embodiment shown in FIG. 1. While the particular embodiment shown in FIG. 5 is rectangular in shape, the server can be of any desired shape such as, but not limited to, circular, oval or square.

The upper shell has a bottom wall or base 122 and upwardly extending side walls 124. The upper shell may further include an outwardly extending lip 126 at the upper end, or peripheral portion, 128 of the upper shell. The lip circumscribes the entire periphery of the upper shell. The lower shell includes a bottom wall or support portion 130, and upwardly extending side walls 132. The lower shell surrounds the upper shell as previously described, and may include an outwardly extending lip 135 at the upper end, or peripheral portion 134 thereof. The upper and lower shells are joined together at their peripheral portions at a joint 138, thereby defining cavity 120. The joint 138 is sealed with a polycarbonate sealant.

A phase change material 136 is disposed in cavity 120. The phase change material substantially fills the cavity and is unrestrained therein as described with respect to the prior embodiment. The phase change material is as described previously and is preferably ethylene vinyl acetate. Outer shell 102 is likewise made of the material described with respect to the embodiment shown in FIG. 1.

When the server is heated so that the phase change material changes phase to a gelatinous state, food which will normally be at a temperature of 170° F. to 200° F., or more preferably from 185° F. to 195° F. after being removed from an oven is placed on the food holder. The phase change material will transfer heat through the outer shell to the food so that it is maintained at a temperature of at least 145° for at least 60 minutes. Because the food is in direct contact with the shell, the temperature of the food will stay above 145° F. for a period generally much longer than an hour. An insulator 140 may be disposed between the phase change material and lower shell 108 so that no heat is lost to the environment and is instead directed through upper shell 110 to the food placed thereon. The insulator 140 may be made from the material which comprises the insulator 80.

Figure 8:
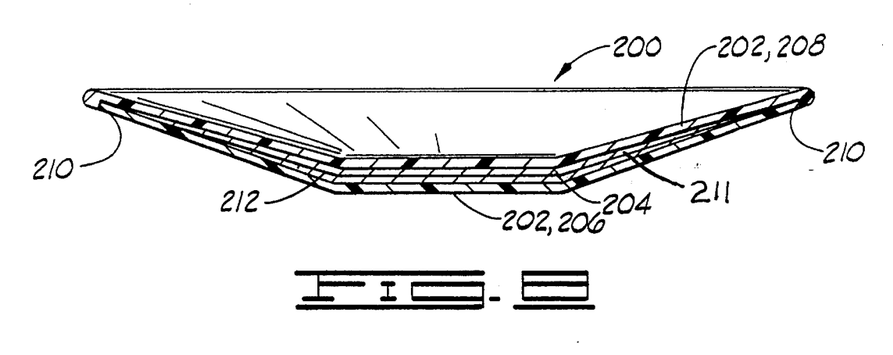
FIG. 8 shows a section view of an additional embodiment of the present invention.

An additional embodiment of an upwardly opening food holder is shown in FIG. 8. The configuration shown there, designated by the numeral 200 is more like a standard plate and is comprised of an outer shell assembly 202 having a cavity 204 disposed therein. Outer shell 202 is comprised of a lower shell 206 and an upper shell 208. The two shells are joined at joint 210 and sealed with a polycarbonate sealant.

As described previously, the cavity will be substantially filled with a phase change material 211 which is preferably ethylene vinyl acetate, and can be heated so that will maintain food at an elevated temperature. An insulator 212 may be disposed between the lower shell 206 and the phase change material.

As is clear from the foregoing, the phase change material can be formed, by injection molding or otherwise, to match the configuration of the virtually any cavity shape. A two-piece construction can then be placed around the formed phase change material and sealed to construct the server. Thus, regardless of the configuration of the food server, the servers of the present invention are of simple construction, eliminate problems of leakage, and transfer the heat required to maintain food at a desirable temperature for an extended period of time. The inner chambers and other restraints required in prior art food servers to prevent leakage are eliminated.

Although preferred embodiments of the invention have been illustrated in the accompanying drawings and described in the foregoing detailed description, it will be understood that the invention is not limited to the embodiment disclosed, but is capable of numerous modifications without departing from the scope of the invention as defined by the appended claims.

What is claimed is:

1. A heat retentive food server comprising:
   an upper shell;
   a lower shell, said upper shell and said lower shell being joined together and having a cavity defined therebetween, said upper and lower shells being comprised of a thermo-plastic material; and
   a heat storage medium disposed in said cavity, said heat storage medium comprising a phase change material substantially filling said cavity and being unrestrained therein, whereby said food server may be heated and placed adjacent food for maintaining food at an elevated temperature.

2. The server of claim 1 wherein said phase change material is a solid at room temperature, said phase change material being formed to substantially match the shape of said cavity.

3. The server of claim 1 wherein said phase change material comprises an injection molding having a shape substantially matching the shape of said cavity.

4. The server of claim 1, wherein said phase change material changes phase from a solid to a viscous, gelatinous state but does not liquify when heated to an elevated temperature.

5. The container of claim 4, wherein said phase change material changes phase to said viscous, gelatinous state at a temperature of 190°–230°.

6. The server of claim 1 wherein said phase change material comprises ethylene vinyl acetate.

7. The server of claim 1, said server comprising a food cover for use with an underlying food holder, wherein said food cover may be heated and placed over said underlying food holder to maintain food placed upon said holder at an elevated temperature.

8. The food cover of claim 7, wherein said food cover will maintain food placed thereunder at a temperature of at least 145° for a minimum of one hour.

9. The food cover of claim 7 where said lower shell comprises
   a top wall; and
   a side wall depending downwardly from said top wall, said upper shell being spaced apart from and surrounding said lower shell thereby defining said cavity.

10. The food cover of claim 9 further comprising an insulator positioned between said phase change material and said upper shell so that heat is transferred from said phase change material through said lower shell and is prevented from dissipating through said upper shell.

11. The food cover of claim 10 wherein said phase change material is ethylene vinyl acetate.

12. The server of claim 1 wherein said outer shell defines a food holder for placing food directly thereon.

13. The food holder of claim 12 wherein said upper shell comprises:

a substantially flat base portion for placing food thereon; and a side wall extending upwardly from said base portion thereby defining an upwardly opening food holder, said lower shell comprising:
a substantially flat support portion spaced downwardly from said upper shell base portion; and
a side wall extending upwardly from said flat portion, said upper and lower shell side walls being joined at the upper ends thereof.

14. The holder of claim 13 further comprising:

an insulator interposed between said phase change material and said lower shell, so that heat is transferred from said phase change material through said upper shell and so that a minimum amount of heat is lost through said lower shell, thereby maintaining said food placed on said upper shell at an elevated temperature for an extended period of time.

15. A heat retaining food server comprising:

an outer shell assembly, said assembly comprising an upper shell and a lower shell, said upper and lower shells being joined at peripheral portions thereof;

a cavity defined by said upper and lower shells; and a phase change material disposed in said cavity, wherein said phase change material stores heat when heated to an elevated temperature, said phase change material comprising ethylene vinyl acetate.

16. The server of claim 15 wherein said phase change material substantially fills said cavity, and is unrestrained therein.

17. The server of claim 15 wherein said phase change material is an injection molding which substantially matches the shape of said cavity.

18. The container of claim 15, said container comprising a heat retentive dome, wherein said phase change material releases heat stored therein through said lower shell to maintain food placed thereunder at an elevated temperature.

19. The container of claim 15, wherein said outer shell assembly comprises a food holder for placing food directly thereon, and wherein said phase change material releases heat stored therein through said upper shell to maintain said food placed thereon at an elevated temperature.

20. The container of claim 19, wherein said upper shell comprises:

a substantially flat base; and a side wall extending upwardly from said base, wherein said lower shell substantially surrounds said upper shell thereby defining said cavity, so that said server comprises a food pan for the placement of food therein, said food being maintained at an elevated temperature for an extended period of time by the release of heat stored in said phase change material through said upper shell.

21. A heat retentive food cover comprising:

an outer shell assembly, said outer shell assembly having a cavity defined therein; and a phase change material disposed in said cavity, said phase change material substantially filling said cavity and being unrestrained therein, wherein said phase change material changes phase from a solid to a gelatinous state to store heat therein when heated toward a phase change temperature, said stored heat being released through said outer shell to maintain food placed below said cover at an elevated temperature.

22. The food cover of claim 21 wherein said phase change material comprises ethylene vinyl acetate.

23. The food cover of claim 21 wherein said outer shell comprises:

an upper shell; and a lower shell joined to said upper shell, said cavity being defined therebetween.

24. The food cover of claim 23 further comprising insulating means interposed between said phase change material and said upper shell so that heat will be transferred from said phase change material through said lower shell, thereby maintaining food placed therebelow at an elevated temperature.

25. The food cover of claim 21 wherein said outer shell further comprises:

a downwardly extending lip for engaging an underlying food holder, wherein heat is directed through said outer shell to said food holder, so that food placed on said holder is maintained at an elevated temperature.

26. The food cover of claim 21, wherein said outer shell is comprised of a thermo-plastic material.

* * * * *

UNITED STATES PATENT AND TRADEMARK OFFICE
CERTIFICATE OF CORRECTION

PATENT NO. : 5,520,103
DATED : May 28, 1996
INVENTOR(S) : David J. Zielinski and Steven R. Lawson It is certified that error appears in the above-identified patent and that said Letters Patent are hereby corrected as shown below:

ON THE TITLE PAGE AND PAGE 2 OF THE PRINTED PATENT

Title page, and second page, Other Publications, all references to the trademark ULTEM should be followed by ® rather than ™.

Title page, Other Publications, two references to Polyetherimida should be to "Polyetherimide."

Title page, Other Publications, two references to ENSOLITE should be followed by ® rather than ™.

Second page, U.S. Patent Documents, the inventor of Patent No. 4,182,405 should be --Hysen-- rather than "Rysen."

Second page, U.S. Patent Documents, the issue date of Patent No. 4,825,939 should be --5/1989-- rather than "6/1989."

Second page, Other Publications, "TEMP-Lock" should be --TEMP-LOCK-- and VICTREX, TEMP-LOCK (two occurrences), MEGA-TEMP, SECO, DINET and DI-NEX should all be followed by ® rather than ™.

Signed and Sealed this

First Day of October, 1996

Attest:

BRUCE LEHMAN

*Attesting Officer*   *Commissioner of Patents and Trademarks*